United States Patent
Ernst (10) Patent No.: US 11,292,436 B2
(45) Date of Patent: Apr. 5, 2022

(54) COMPONENT FOR FILLING A LIQUID INTO A LIQUID CONTAINER

(71) Applicant: Bayerische Motoren Werke Aktiengesellschaft, Munich (DE)

(72) Inventor: Lorenz Ernst, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 781 days.

(21) Appl. No.: 14/757,454

(22) Filed: Dec. 23, 2015

(65) Prior Publication Data

US 2016/0152212 A1    Jun. 2, 2016

Related U.S. Application Data

(63) Continuation of application No. PCT/EP2014/062791, filed on Jun. 18, 2014.

(30) Foreign Application Priority Data

Jun. 24, 2013   (DE) .................... 10 2013 211 958.5

(51) Int. Cl.
*B60S 1/50* (2006.01)
*B60K 15/04* (2006.01)

(52) U.S. Cl.
CPC .............. *B60S 1/50* (2013.01); *B60K 15/04* (2013.01); *B60K 15/0406* (2013.01)

(58) Field of Classification Search
CPC . B60S 1/50; B60S 1/52; B60K 15/035; B60K 15/04; B60K 15/0403; B60K 15/077; B60K 2015/047; B60K 2015/0474; B60K 2015/0775
USPC ..... 220/86.1, 86.2, 86.3, 86.4; 141/297, 331
See application file for complete search history.

(56) References Cited

U.S. PATENT DOCUMENTS

| | | | | | |
|---|---|---|---|---|---|
| 3,991,792 | A | * | 11/1976 | Kettler | B60K 15/0403 138/103 |
| 5,226,574 | A | * | 7/1993 | Durinzi, Jr. | B65D 25/42 215/384 |
| 5,979,511 | A | * | 11/1999 | Ono | B62J 37/00 137/588 |
| 6,223,793 | B1 | * | 5/2001 | Donoughe | B60S 1/50 141/331 |
| 6,530,393 | B2 | * | 3/2003 | Reinelt | B60K 15/04 137/256 |

(Continued)

FOREIGN PATENT DOCUMENTS

DE      1 784 086 U      2/1959
DE      200 22 285 U1    8/2001

(Continued)

OTHER PUBLICATIONS

International Search Report (PCT/ISA/210) issued in International Application No. PCT/EP2014/062791 dated Aug. 22, 2014, with English translation (Four (4) pages).

(Continued)

*Primary Examiner* — Robert Poon
(74) *Attorney, Agent, or Firm* — Crowell & Moring LLP (57) ABSTRACT

A component for filling a liquid into a liquid container has a filler neck that comprises a filler opening and an outflow portion that can be connected to the liquid container and has an outflow opening. At least one intermediate portion is located between the filler neck and the outflow portion and which, at least in a part adjoining the filler neck, forms at least one widening of the component relative to the filler neck for calming a liquid filled into the component.

16 Claims, 8 Drawing Sheets

(56) References Cited

U.S. PATENT DOCUMENTS

| | | | | |
|---|---|---|---|---|
| 2002/0083997 A1* | 7/2002 | O'Connell | ............. | B60K 15/04 141/46 |
| 2006/0138139 A1* | 6/2006 | Keller | ................ | B60K 15/0406 220/295 |
| 2013/0256326 A1* | 10/2013 | Gorecki | ................... | B60S 1/50 220/746 |
| 2014/0319134 A1* | 10/2014 | Olsen | ....................... | B60S 1/50 220/86.2 |
| 2015/0251532 A1* | 9/2015 | Kato | ..................... | B60K 15/04 220/86.2 |
| 2015/0314677 A1* | 11/2015 | Booth | ................... | B60K 15/04 220/562 |
| 2016/0222923 A1* | 8/2016 | Vulkan | ................ | B60K 15/035 |

FOREIGN PATENT DOCUMENTS

| | | |
|---|---|---|
| DE | 200 23 339 U1 | 10/2003 |
| DE | 102 34 105 A1 | 2/2004 |
| DE | 102 34 105 B4 | 1/2006 |
| DE | 100 50 214 B4 | 6/2012 |
| EP | 1 256 498 A1 | 11/2002 |
| JP | 2010-89702 A | 4/2010 |
| WO | WO 2013-085503 A1 | 6/2013 |

OTHER PUBLICATIONS

German Search Report issued in counterpart German Application No. 10 2013 211 958.5 dated Mar. 5, 2014, with English translation (Ten (10) pages).

\* cited by examiner

COMPONENT FOR FILLING A LIQUID INTO A LIQUID CONTAINER

CROSS REFERENCE TO RELATED APPLICATIONS

This application is a continuation of PCT International Application No. PCT/EP2014/062791, filed Jun. 18, 2014, which claims priority under 35 U.S.C. § 119 from German Patent Application No. 10 2013 211 958.5, filed Jun. 24, 2013, the entire disclosures of which are herein expressly incorporated by reference.

BACKGROUND AND SUMMARY OF THE INVENTION

The invention relates to a component for filling a liquid into a liquid container, having a filler neck which has a filler opening, and an outlet section which can be connected to the liquid container and has an outlet opening.

Furthermore, the invention relates to a unit for holding a liquid, having at least one liquid container and at least one component for filling the liquid into the liquid container.

In vehicles there are usually liquid containers for holding various liquids. For example, liquid containers for holding washing water, cooling liquid or the like are installed.

The respective liquid can be filled into the liquid container via a filler component which is connected to the liquid container. This is known, in particular, in relation to a liquid container which is provided for supplying washing water. Such a washing water container is generally filled by a user of a vehicle, but can also be filled by specialist personnel, for example in the course of vehicle servicing operations.

It is also known that a washing water container can often only be filled relatively slowly and often only with interruptions. This is the case because conventional filler components usually have a relatively constantly small circular cross section profile, and frequently also have bends with relatively tight bending radii. As a result of the contact of the liquid with the inner wall of such liquid components, edging occurs in the liquid and ram pressure comes about in the liquid. This results, in turn, in backing up of the liquid and in the formation of foam in the filler component. In order to prevent this, it is necessary either to fill the liquid very carefully and slowly into the filler component or to interrupt a corresponding filling process in order to wait for the foam to break up.

DE 102 34 105 B4 discloses a liquid container for vehicles which is to be capable of being filled with a liquid without gurgling or spraying.

The object of the invention is to permit a liquid to be filled into a liquid container in a way which is not very costly in terms of time or work.

This and other objects are achieved by means of a component for filling a liquid into a container, as well as a unit for holding the liquid, in accordance with embodiments of the invention.

According to the invention, the component has at least one intermediate section which is arranged between the filler neck and the outlet section. The intermediate section forms, at least in its region adjoining the filler neck, at least one widened portion of the component compared to the filler neck. The widened portion is configured to calm a liquid filled into the component.

As a result of the embodiment of the widened portion subsequent to the filler neck, a liquid which is filled into the component can become calmed, with the result that a significantly lower ram pressure occurs in the liquid than is the case with conventional filler components. As a result, the liquid can be filled more quickly into the component and into a liquid container via said component. In particular, the widened portion of the component and the associated calming of the liquid which is filled therein successfully avoids the formation of foam within the component. Therefore, the liquid can be filled into the component, and via the latter into a liquid container, without interruptions.

According to one advantageous refinement, the widened portion forms a chamber which is arranged relative to the filler neck in such a way that a liquid which is filled into the filler neck is directed against a wall of the chamber, which wall is arranged opposite the filler neck. The wall forms after this an impact surface, by means of which the flow of liquid can be deflected. As a result, the component can be adapted in an optimum way to the size and configuration of the respectively available installation space in which the component is to be arranged. The shaping of the chamber can also be adapted to the size and configuration of the respectively available installation space.

According to a further advantageous refinement, a projection of the cross-sectional face of the filler neck onto the wall is surrounded circumferentially by an edge section of the wall. This is similar to a specific configuration and arrangement of the chamber with respect to the filler neck. The larger the edge section of the wall surrounding and running around the projection of the cross-sectional face of the filler neck on the wall is, the better the design of the chamber for the purpose according to the invention.

A further advantageous embodiment provides that the projection of the cross-sectional face of the filler neck onto the wall is arranged centrally on the wall.

It is also considered as advantageous if the projection of the cross-sectional face of the filler neck onto the wall is arranged in an edge region of the wall. This off-center arrangement of the projection face can be selected as an alternative to the above-mentioned central arrangement of the projection face. The optimum arrangement of the projection face on the wall is preferably selected taking into account the size and the configuration of the respectively available installation space.

In a further advantageous embodiment, the outlet section is connected to a side of the chamber which is arranged transversely with respect to the wall. According to this arrangement, a liquid which is filled into the widened portion or the chamber can be discharged essentially laterally from the chamber.

According to a further advantageous refinement, the outlet section is embodied in the form of a funnel. The liquid, which is filled into the component via the filler neck and which has become calm after passing through the intermediate section, can therefore be fed to a filler opening in a liquid container. By means of the outlet section in the form of a funnel, the calmed liquid can be fed quickly and at relatively high speed to a liquid container.

Furthermore, it is proposed that the outlet section has at least partially a circular cross section. This corresponds to a customary configuration, with the result that the component can be easily connected to a conventional liquid container, without structural changes having to be made to the liquid container.

In addition, it is considered advantageous if the outlet section has at least partially a rectangular cross section. The shape which is selected for the cross section of the outlet section depends on the respective conditions. In the case of an outlet section with a rectangular cross section, the liquid preferably flows away via one of the long side faces of the outlet section, with the result that the liquid can also be calmed further while it passes through the outlet section.

Furthermore, according to the invention, the component of the unit is embodied according to one of the above-mentioned configurations or any desired combination thereof. The advantages which are specified above with respect to the component are associated with this. The liquid container can be designed to hold washing water, cooling liquid or the like.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
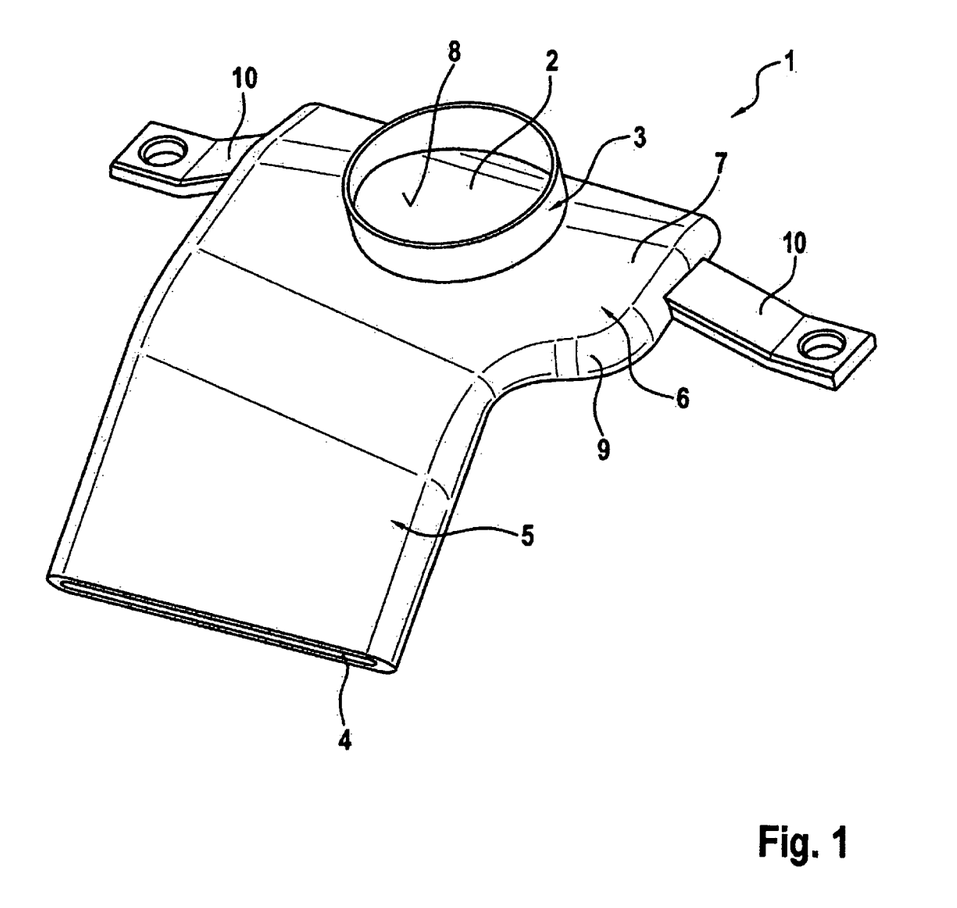
FIG. 1 is a perspective illustration of an exemplary embodiment of the component according to the invention.

FIG. 1 shows a perspective illustration of an exemplary embodiment of the component 1 according to the invention for filling a liquid into a liquid container (not shown). The component 1 has a filler neck 3 which includes a filler opening 2, and an outlet section 5 which can be connected to the liquid container and has an outlet opening 4. Furthermore, the component 1 includes an intermediate section 6 which is arranged between the filler neck 3 and the outlet section 5 and forms, at least in its region adjoining the filler neck 3, at least one widened portion of the component 1 compared to the filler neck 3, said widened portion being configured to calm a liquid filled into the component 1.

The widened portion forms a chamber 7 which is arranged relative to the filler neck 3 in such a way that a liquid which is filled into the filler neck 3 is directed against the lower wall 8 of the chamber 7 facing away from the viewer, which wall 8 is arranged opposite the filler neck 3. As is apparent from FIG. 1, the projection of the cross-sectional face of the filler neck 3 onto the wall 8 is surrounded circumferentially by an edge section of the wall 8, wherein the projection of the cross-sectional face of the filler neck 3 onto the wall 8 is arranged centrally on the wall 8. Attachment clips 10, by which the component 1 can be attached to a bodywork (not shown) of a vehicle are arranged laterally on the chamber 7.

The outlet section 5 is connected to a side 9 of the chamber 7 which is arranged transversely with respect to the wall 8. In its connecting regions of the wall 7, the outlet section 5 is embodied in the form of a funnel and has a rectangular cross section.

Figure 2:
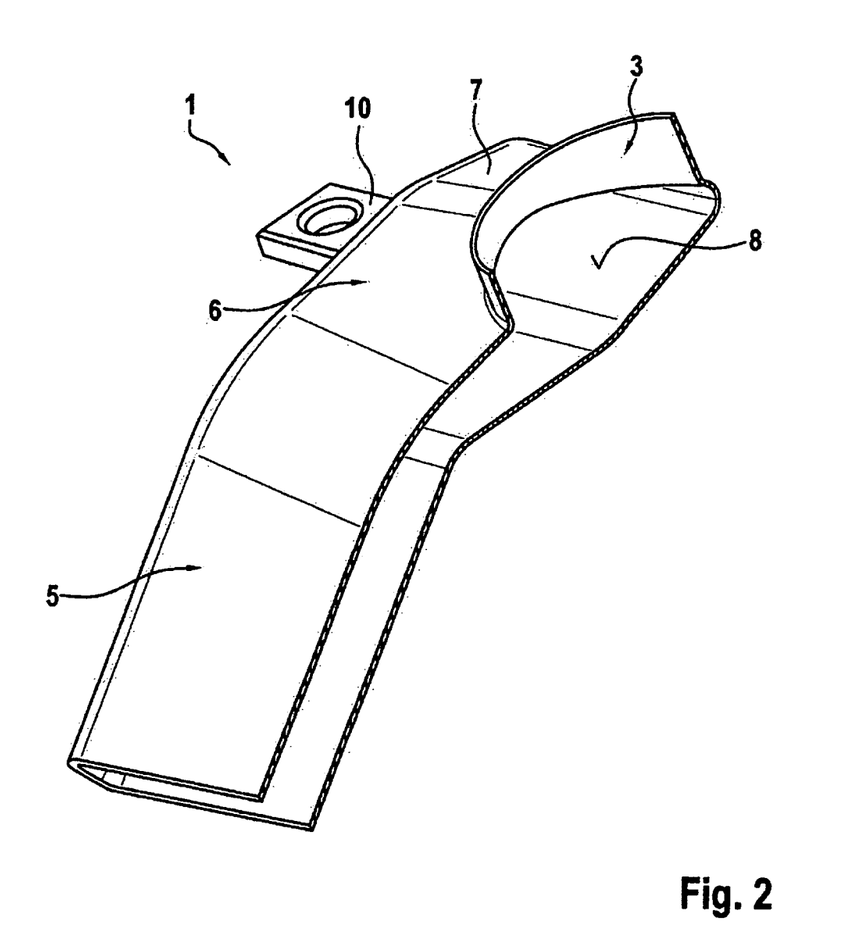
FIG. 2 is a sectional illustration of the component shown in FIG. 1.

FIG. 2 shows a sectional illustration of the component 1 which is shown in FIG. 1.

Figure 3:
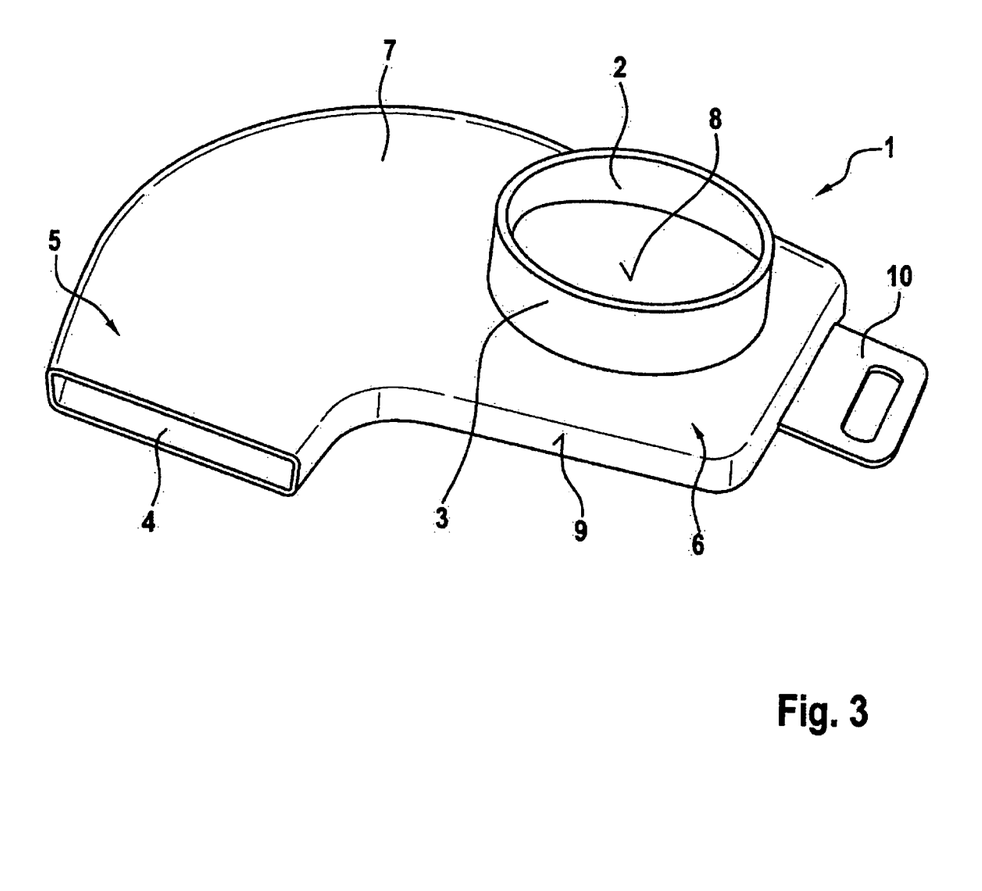
FIG. 3 is a perspective illustration of a further exemplary embodiment of the component according to the invention.

FIG. 3 shows a perspective illustration of a further exemplary embodiment of the component 1 according to the invention for filling a liquid into a liquid container (not shown). A significant difference from the exemplary embodiment shown in FIGS. 1 and 2 is that the projection of the cross-sectional face of the filler neck 3 onto the wall 8 is arranged in an edge region of the wall 8.

Figure 4:
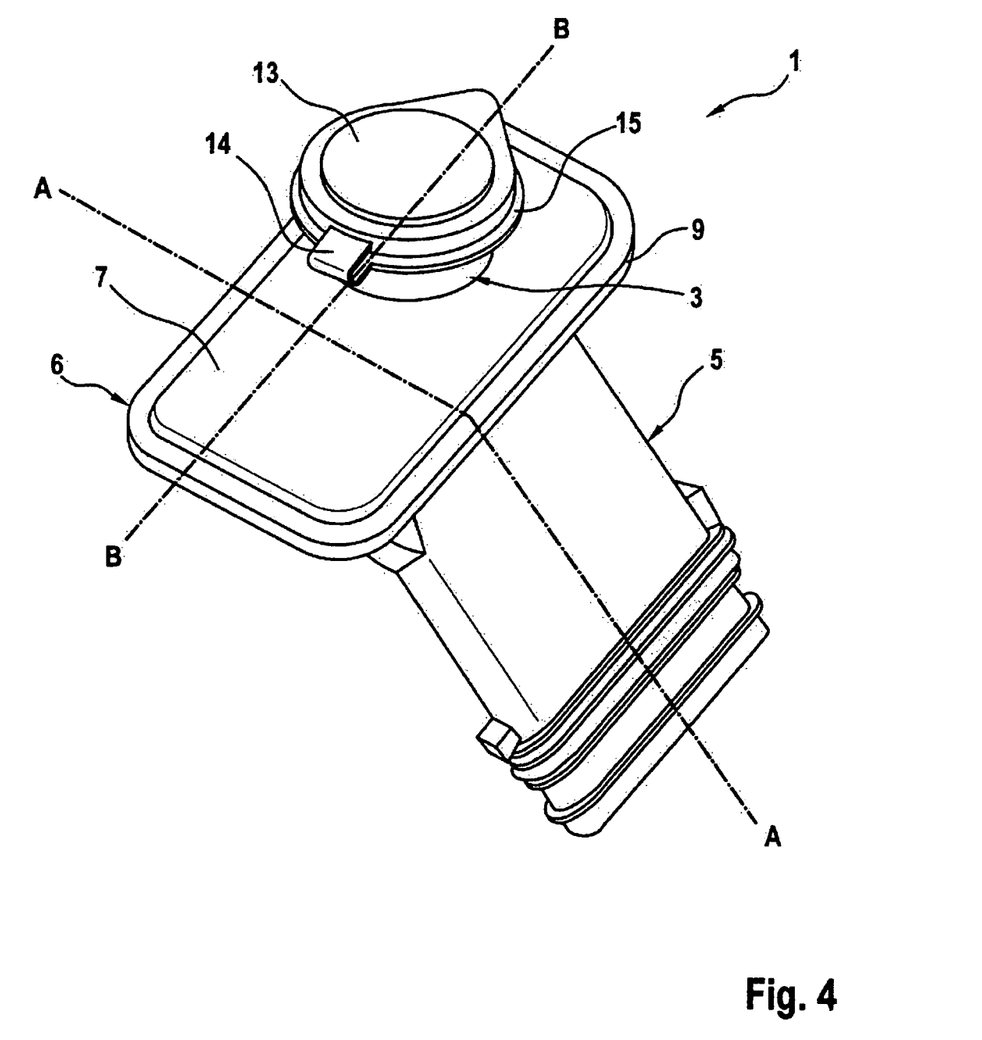
FIG. 4 is a perspective illustration of a further exemplary embodiment of the component according to the invention.
Figure 5:
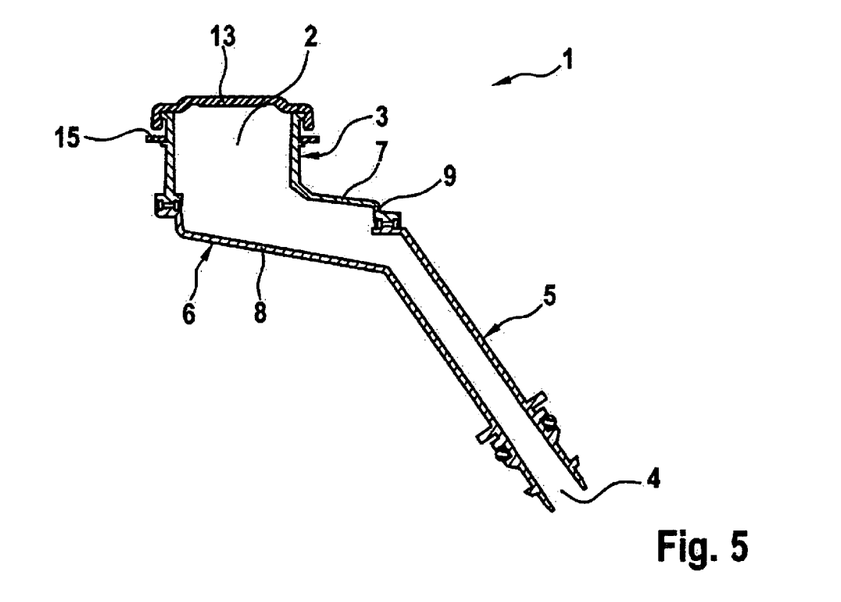
FIG. 5 is a sectional illustration of the component shown in FIG. 4.
Figure 6:
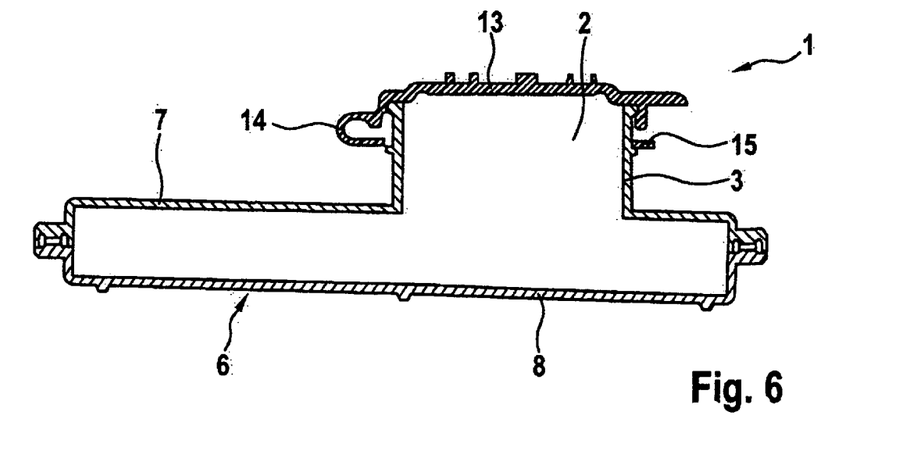
FIG. 6 is a further sectional illustration of the component shown in FIG. 4.

FIG. 4 shows a perspective illustration of a further exemplary embodiment of the component 1 according to the invention for filling a liquid into a liquid container (not shown). The component 1 has a filler neck 3 which includes a filler opening 2 shown in FIGS. 5 and 6, and an outlet section 5 which can be connected to the liquid container and includes an outlet opening 4 (shown in FIG. 5). Furthermore, the component 1 includes an intermediate section 6 which is arranged between the filler neck 3 and the outlet section 5 and forms, at least in its region adjoining the filler neck 3, a widened portion of the component 1 compared to the filler neck 3, said widened portion being configured to calm a liquid filled into the component 1. The widened portion of the component 1 is generated by the, in particular also external, shaping of the intermediate section 6, and not by a variation of the material thickness of the walls of the intermediate section compared to the material thickness of the walls of the filler neck 3, since such a variation of the wall thickness would be clearly too small for the purpose according to the invention. Arranged on the filler neck 3 is a lid 13 which is in its closed position and which is fixed to the filler neck 3 by way of a latching mechanism which is shown in FIGS. 5 and 6. The lid 13 is connected via a flexible clip 14 to a ring 15 which is captively arranged on the filler neck 3.

FIG. 5 shows a sectional illustration of the component 1 which is shown in FIG. 4, according generally to the sectional plane A-A shown in FIG. 4 while extending through the filler neck area. The widened portion forms a chamber 7 which is arranged relative to the filler neck 3 in such a way that a liquid which is filled into the filler neck 3 is directed against the lower wall 8 of the chamber 7, which lower wall 8 is arranged opposite the filler neck 3. As is apparent from FIG. 5, the projection of the cross-sectional face of the filler neck 3 onto the wall 8 is surrounded at least partially circumferentially by an edge section of the wall 8, wherein the projection of the cross-sectional face of the filler neck 3 onto the wall 8 is arranged in an edge region of the wall 8. The outlet section 5 is connected to a side 9 of the chamber 7 which is arranged transversely with respect to the wall 8. The outlet section 5 is embodied in the form of a funnel in its region which is connected to the chamber 7, and has an approximately rectangular, flattened cross section.

FIG. 6 shows a sectional illustration of the component 1 which is shown in FIG. 4, according to the sectional plane B-B shown in FIG. 4.

Figure 7:
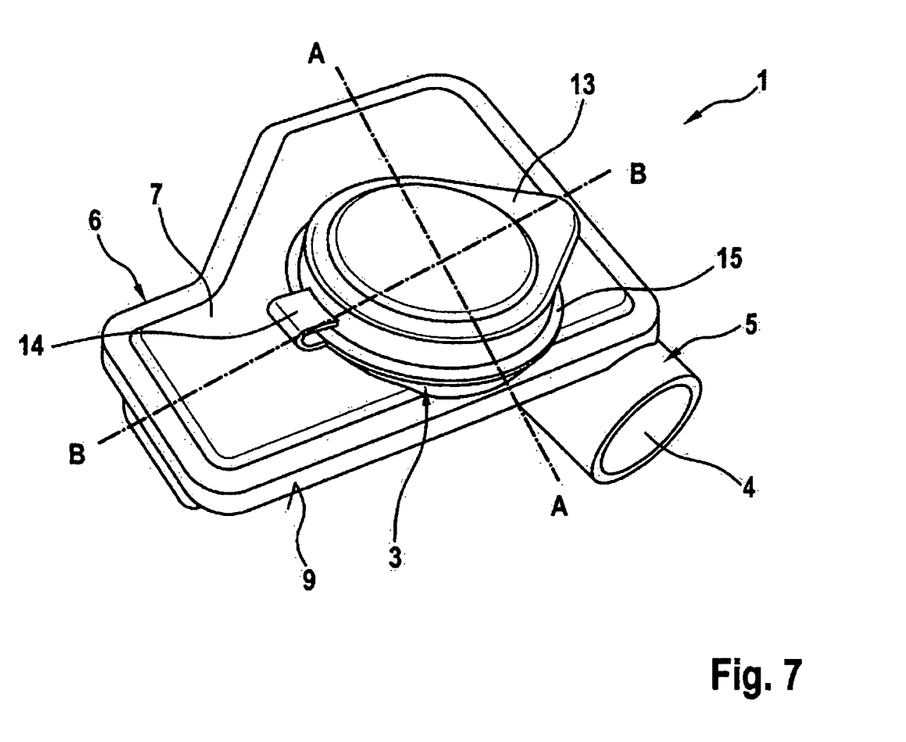
FIG. 7 is a perspective illustration of a further exemplary embodiment of the component according to the invention.

FIG. 7 shows a perspective illustration of a further exemplary embodiment of the component 1 according to the invention for filling a liquid into a liquid container (not shown). The component 1 has a filler neck 3 which includes a filler opening 2 shown in FIGS. 8 and 9, and an outlet section 5 which can be connected to the liquid container and comprises an outlet opening 4. Furthermore, the component 1 includes an intermediate section 6 which is arranged between the filler neck 3 and the outlet section 5 and forms, at least in its region adjoining the filler neck 3, a widened portion of the component 1 compared to the filler neck 3, said widened portion being configured to calm a liquid which is filled into the component 1. The widened portion of the component 1 is generated by the, in particular also external, shaping of the intermediate section 6, and not by variation of the material thickness of the walls of the intermediate section compared to the material thickness of the walls of the filler neck 3, since such a variation of the wall thickness would turn out to be clearly too small for the purpose according to the invention. Arranged on the filler neck 3 is a lid 13 which is in its closed position and which is secured to the filler neck 3 by way of a latching mechanism (shown in FIGS. 8 and 9). The lid 13 is connected via a flexible clip 14 to a ring 15 which is captively arranged on the filler neck 3.

Figure 8:
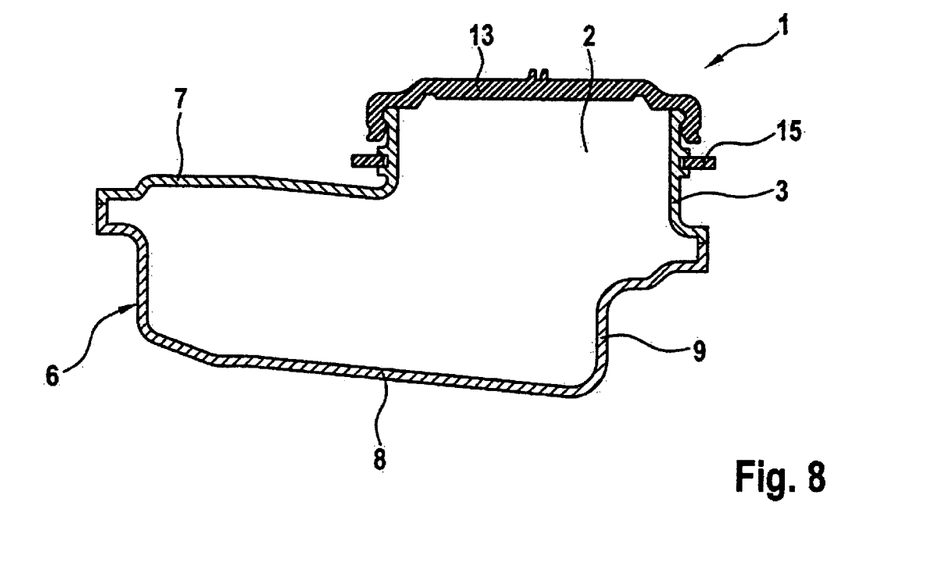
FIG. 8 is a sectional illustration of the component shown in FIG. 7.

FIG. 8 shows a sectional illustration of the component 1 shown in FIG. 7, according to the sectional plane A-A shown in FIG. 7. The widened portion forms a chamber 7 which is arranged relative to the filler neck 3 in such a way that a liquid which is filled into the filler neck 3 is directed against the lower wall 8 of the chamber 7, which lower wall 8 is arranged opposite the filler neck 3. As is apparent from FIG. 8, the projection of the cross-sectional face of the filler neck 3 onto the wall 8 is surrounded partially circumferentially by an edge section of the wall 8, wherein the projection of the cross-sectional face of the filler neck 3 onto the wall 8 is arranged in an edge region of the wall 8. The outlet section 5 is connected to a side 9 of the chamber 7 which is arranged transversely with respect to the wall 8. The outlet section 5 is embodied in the form of a funnel in its region which connects to the chamber 7, and has a circular cross section.

Figure 9:
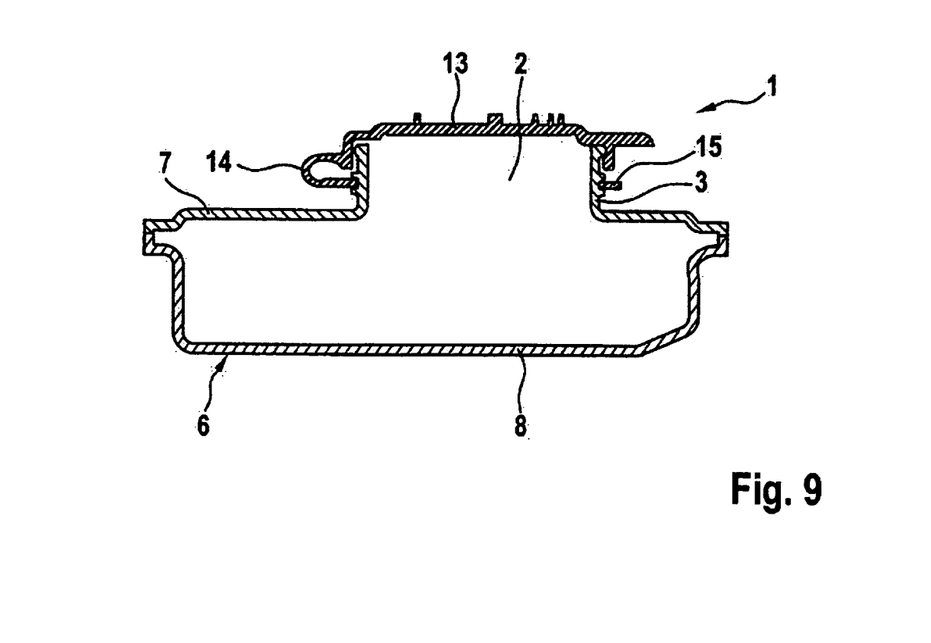
FIG. 9 is a further sectional illustration of the component shown in FIG. 7.

FIG. 9 shows a sectional illustration of the component 1 which is shown in FIG. 7, according to the sectional plane B-B shown in FIG. 7.

Figure 10:
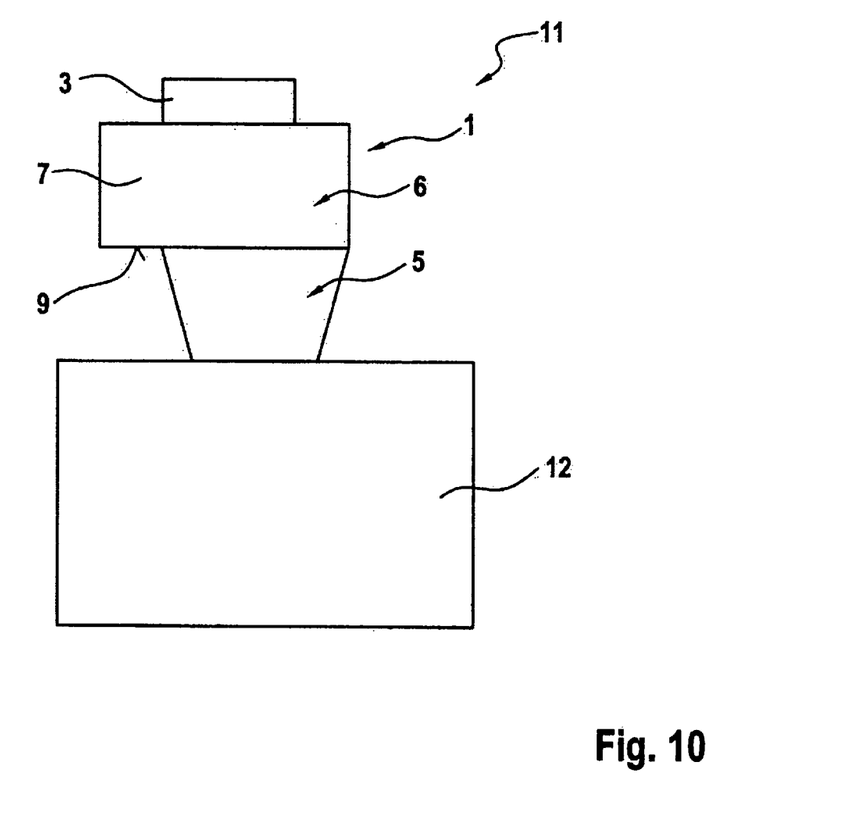
FIG. 10 is a schematic illustration of an exemplary embodiment of the unit according to the invention.

FIG. 10 shows a schematic illustration of an exemplary embodiment of the unit 11 according to the invention for holding a liquid. The unit 11 has a liquid container 12 and a component 1 for filling the liquid into the liquid container 12. The component 1 can be embodied according to the exemplary embodiments in FIG. 1, 3 or 7.

LIST OF REFERENCE NUMBERS

1 Component
2 Filler opening
3 Filler neck
4 Outlet opening
5 Outlet section
6 Intermediate section
7 Chamber
8 Wall
9 Side
10 Attachment clip
11 Unit
12 Liquid container
13 Lid
14 Clip
15 Ring The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A filler component through which liquid is filled into a liquid container, the filler component comprising:
    a straight filler neck having an outer filler opening;
    an outlet section having an outlet opening, the outlet section being connectable to the liquid container;
    at least one intermediate section arranged between the filler neck and the outlet section, the filler neck extending from the outer filling opening to the at least one intermediate section, wherein
    the at least one intermediate section is configured to form at least one widened portion of the component compared to the filler neck at least in a region of the intermediate section adjoining the filler neck,
    the at least one widened portion is configured to calm a liquid filled into the component,
    the widened portion forms a chamber having a lower wall with a planar surface, and
    the chamber is arranged relative to the filler neck such that the liquid filled into the component through the filler opening is directed against the lower wall of the chamber, said lower wall being arranged opposite the filler neck, wherein
    a projection of a cross-sectional face of the filler neck onto the planar surface of the lower wall is surrounded over at least a majority of a circumference of the projection by an edge section of the planar surface of the lower wall of the chamber.

2. The component according to claim 1, wherein the projection of the cross-sectional face of the filler neck onto the wall is arranged centrally on the wall of the chamber.

3. The component according to claim 1, wherein the projection of the cross-sectional face of the filler neck onto the wall is arranged in an edge region of the wall of the chamber.

4. The component according to claim 1, wherein the outlet section is connected to a side of the chamber, which side is arranged transversely with respect to the wall of the chamber.

5. The component according to clam 2, wherein the outlet section is connected to a side of the chamber, which side is arranged transversely with respect to the wall of the chamber.

6. The component according to claim 3, wherein the outlet section is connected to a side of the chamber, which side is arranged transversely with respect to the wall of the chamber.

7. The component according to claim 3, wherein the outlet section is configured as a funnel.

8. The component according to claim 4, wherein the outlet section is configured as a funnel.

9. The component according to claim 1, wherein the outlet section has at least partially a circular cross-section.

10. The component according to claim 7, wherein the outlet section has at least partially a circular cross-section.

11. The component according to claim 1, wherein the outlet section has at least partially a rectangular cross-section.

12. The component according to claim 7, wherein the outlet section has at least partially a rectangular cross-section.

13. A unit for holding a liquid, comprising:
    a liquid container;
    a filler component through which liquid is filled into the liquid container, wherein the component comprises:
    a filler neck having a filler opening;
    an outlet section having an outlet opening, the outlet section being connected to the liquid container;
    at least one intermediate section arranged between the filler neck and the outlet section, wherein the at least one intermediate section is configured to form at least one widened portion of the component compared to the filler neck at least in a region of the intermediate section adjoining the filler neck, the at least one widened portion is configured to calm a liquid filled into the component, the widened portion forms a chamber having a lower wall with a planar surface, and the chamber is arranged relative to the filler neck such that the liquid filled into the component through the filler opening is directed against the lower wall of the chamber, said lower wall being arranged opposite the filler neck, wherein a projection of a cross-sectional face of the filler neck onto the planar surface of the lower wall is surrounded over at least a majority of a circumference of the projection by an edge section of the planar surface of the lower wall of the chamber.

14. The unit according to claim 13, wherein the projection of the cross-sectional face of the filler neck onto the wall is arranged centrally on the wall of the chamber.

15. The unit according to claim 13, wherein the projection of the cross-sectional face of the filler neck onto the wall is arranged in an edge region of the wall of the chamber.

16. The unit according to claim 13, wherein the outlet section is connected to a side of the chamber, which side is arranged transversely with respect to the wall of the chamber.

* * * * *